(12) United States Patent
Hung et al.

(10) Patent No.: US 9,213,374 B2
(45) Date of Patent: Dec. 15, 2015

(54) COMPUTER DEVICE

(71) Applicant: Wistron Corporation, New Taipei (TW)

(72) Inventors: Ming-Hua Hung, New Taipei (TW);
Tsung-Hsien Tsai, New Taipei (TW);
Hung-Li Chen, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 118 days.

(21) Appl. No.: 14/226,850

(22) Filed: Mar. 27, 2014

(65) Prior Publication Data
US 2015/0116932 A1 Apr. 30, 2015

(30) Foreign Application Priority Data

Oct. 30, 2013 (TW) .............................. 102139388 A

(51) Int. Cl.
*G06F 1/16* (2006.01)
*G06F 1/20* (2006.01)

(52) U.S. Cl.
CPC ............ *G06F 1/1681* (2013.01); *G06F 1/1626* (2013.01); *G06F 1/203* (2013.01)

(58) Field of Classification Search
CPC ... G06F 1/1615; G06F 1/1626; G06F 1/1632; G06F 1/1681; G06F 1/1616; G06F 1/20; G06F 1/203
See application file for complete search history.

(56) References Cited

U.S. PATENT DOCUMENTS

| 5,747,187 | A | * | 5/1998 | Byon | H01M 2/348 429/57 |
| 5,774,333 | A | * | 6/1998 | Janik | G06F 1/1615 361/679.26 |
| 6,212,069 | B1 | * | 4/2001 | Janik | G06F 1/1616 165/86 |
| 6,243,261 | B1 | * | 6/2001 | Janik | G06F 1/1615 361/679.46 |
| 6,668,550 | B2 | * | 12/2003 | Yazawa | F03G 7/065 60/527 |
| 7,480,141 | B2 | * | 1/2009 | Takenoshita | G06F 1/203 349/161 |
| 7,833,649 | B2 | * | 11/2010 | Jones | H01M 12/065 137/79 |
| 8,104,548 | B2 | * | 1/2012 | Ma | E21B 7/06 175/61 |
| 9,123,934 | B2 | * | 9/2015 | Liang | H01M 2/1022 |
| 2004/0104580 | A1 | * | 6/2004 | Spiessl | D06F 37/42 292/84 |
| 2006/0184231 | A1 | * | 8/2006 | Rucker | A61F 2/88 623/1.15 |
| 2011/0128704 | A1 | * | 6/2011 | Chang | H05K 7/20727 361/697 |
| 2012/0307441 | A1 | * | 12/2012 | Hung | G06F 1/1632 361/679.09 |
| 2014/0021727 | A1 | * | 1/2014 | Mai | G06F 1/1615 292/219 |
| 2014/0091210 | A1 | * | 4/2014 | Hogo | G06F 1/1601 250/216 |
| 2014/0097316 | A1 | * | 4/2014 | Hsu | F16M 11/10 248/351 |
| 2015/0016057 | A1 | * | 1/2015 | Fu | F03G 7/065 361/679.55 |
| 2015/0024808 | A1 | * | 1/2015 | Fu | H04M 1/0237 455/575.4 |

\* cited by examiner

*Primary Examiner* — Adrian S Wilson
*Assistant Examiner* — Abhishek Rathod
(74) *Attorney, Agent, or Firm* — Winston Hsu; Scott Margo

(57) ABSTRACT

A computer device includes a main casing, a computer body disposed in the main casing, a linkage mechanism including first and second sheets and a first shape-memory alloy, and a movable casing pivoted to the main casing. The main casing is for engaging with the movable casing to position the movable casing at an open position exposed from the main casing. A driving end of the first sheet is movably inserted into a slot of the movable casing. The second sheet is disposed on a recess structure of the main casing and pivoted to the first sheet. The first shape-memory alloy is pivoted to one of the second sheet and the recess structure and the driving end for moving the driving end along the slot when being heated to shorten or elongate to push the movable casing from a closed position contained in the recess structure to the open position.

21 Claims, 16 Drawing Sheets

COMPUTER DEVICE

BACKGROUND OF THE INVENTION

1. Field of the Invention

The present invention relates to a computer device, and more specifically, to a computer device utilizing a shape-memory alloy to drive a movable casing to be contained in or exposed from a main casing.

2. Description of the Prior Art

In general, for making an outer appearance of a computer device (e.g. a notebook) look more compact, the computer device adopts the design in which a connecting port (or a heat dissipating hole) is disposed in a movable casing pivoted to a main casing so that the movable casing could be selectively contained in or exposed from the main casing, for hiding the connecting port (or the heat dissipating hole) when the computer device is in a turned off state or has no needs to utilize the connecting port (or the heat dissipating hole).

However, since the aforesaid design needs to dispose a step motor in the computer device for providing a driving force to close or open the movable casing, the aforesaid design causes the problem that additional disposal of the step motor would occupy excessive inner space of the computer device, so as to be disadvantageous to the thinning design of the computer device, as well as would greatly increase the overall manufacturing cost of the computer device.

SUMMARY OF THE INVENTION

The present invention provides a computer device including a main casing, a computer body, a movable casing, and a linkage mechanism. The main casing has a recess structure. A first positioning structure is formed on a side wall of the recess structure. The computer body is disposed in the main casing. The movable casing has a first slot. The movable casing is pivoted to the main casing for rotating to a closed position contained in the recess structure or an open position exposed from the main casing relative to the main casing. A second positioning structure is formed on the movable casing corresponding to the first positioning structure. The first positioning structure is for engaging with the second positioning structure to position the movable casing at the open position. The linkage mechanism is disposed in the recess structure. The linkage mechanism includes a first sheet, a second sheet, and a first shape-memory alloy. The first sheet has a first driving end and a first connecting end. The first driving end is movably inserted into the first slot. The second sheet is disposed on the recess structure and pivoted to the first connecting end. The first shape-memory alloy is pivoted to one of the second sheet and the recess structure and the driving end of the first sheet. The first shape-memory alloy is for driving the first driving end to move along the first slot when being heated to shorten or elongate to make the first sheet rotate relative to the second sheet, so as to push the movable casing to rotate from the closed position to the open position relative to the main casing.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
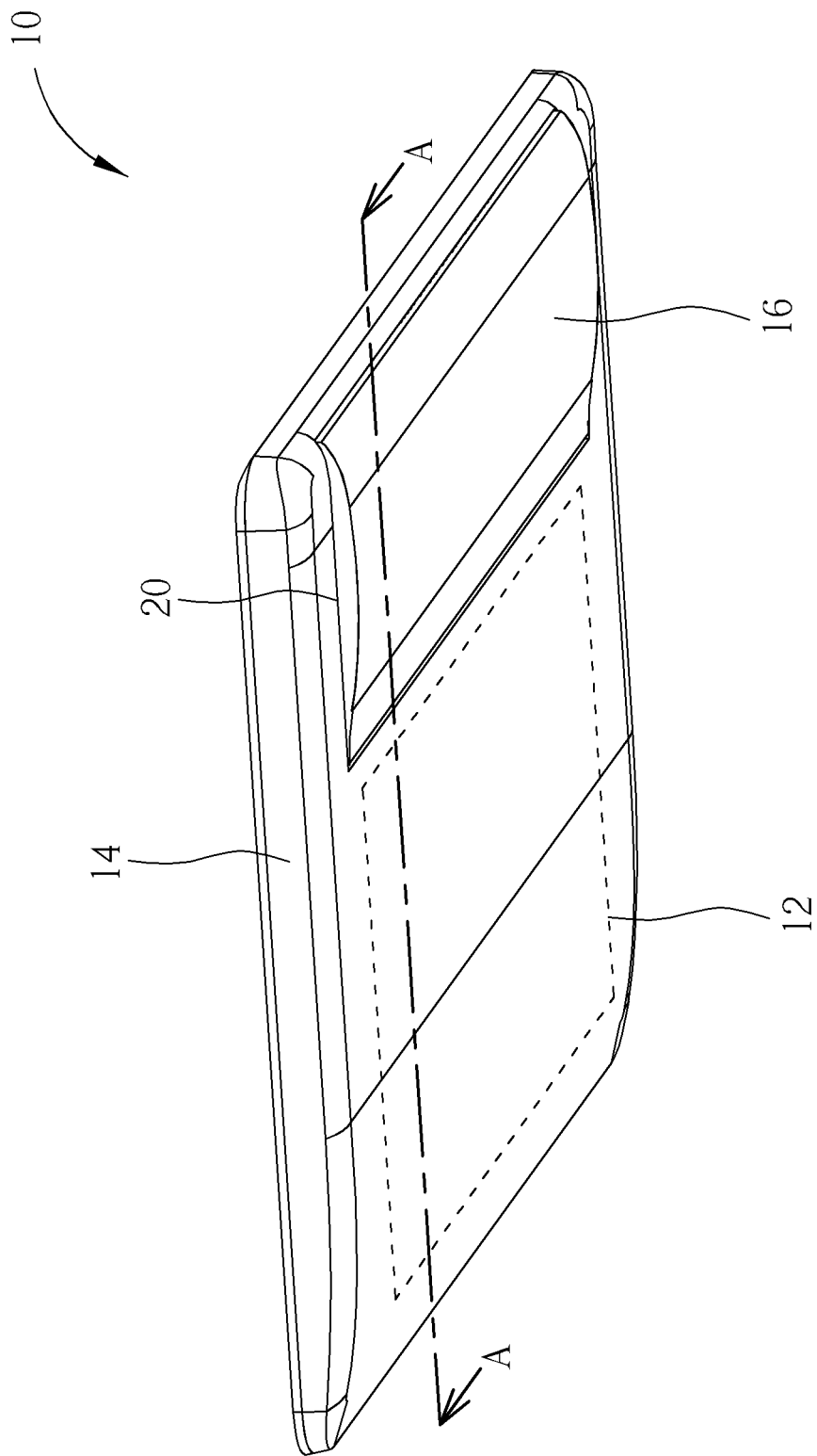
FIG. 1 is a diagram of a computer device according to a first embodiment of the present invention.
Figure 2:
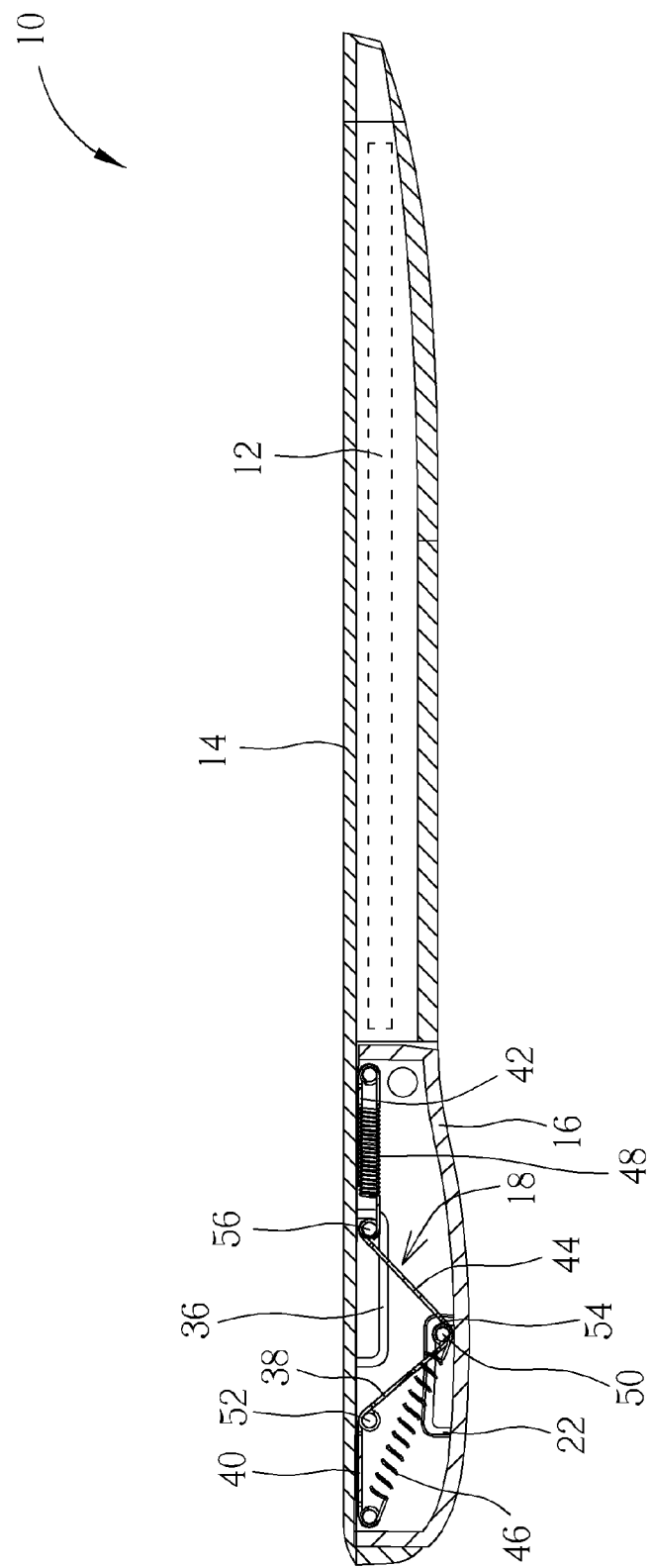
FIG. 2 is a sectional diagram of the computer device in FIG. 1 along a sectional line A-A.

Please refer to FIG. 1 and FIG. 2. FIG. 1 is a diagram of a computer device 10 according to a first embodiment of the present invention. FIG. 2 is a sectional diagram of the computer device 10 in FIG. 1 along a sectional line A-A. As shown in FIG. 1 and FIG. 2, the computer device 10 includes a computer body 12 (briefly depicted by dashed lines in FIG. 1 and FIG. 2), a main casing 14, a movable casing 16, and a linkage mechanism 18. The computer body 12 is disposed in the main casing 14. The computer body 12 could include conventional computer components (e.g. a main board and a central processing unit), and the related description is omitted herein since it is commonly seen in the prior art.

Figure 3:
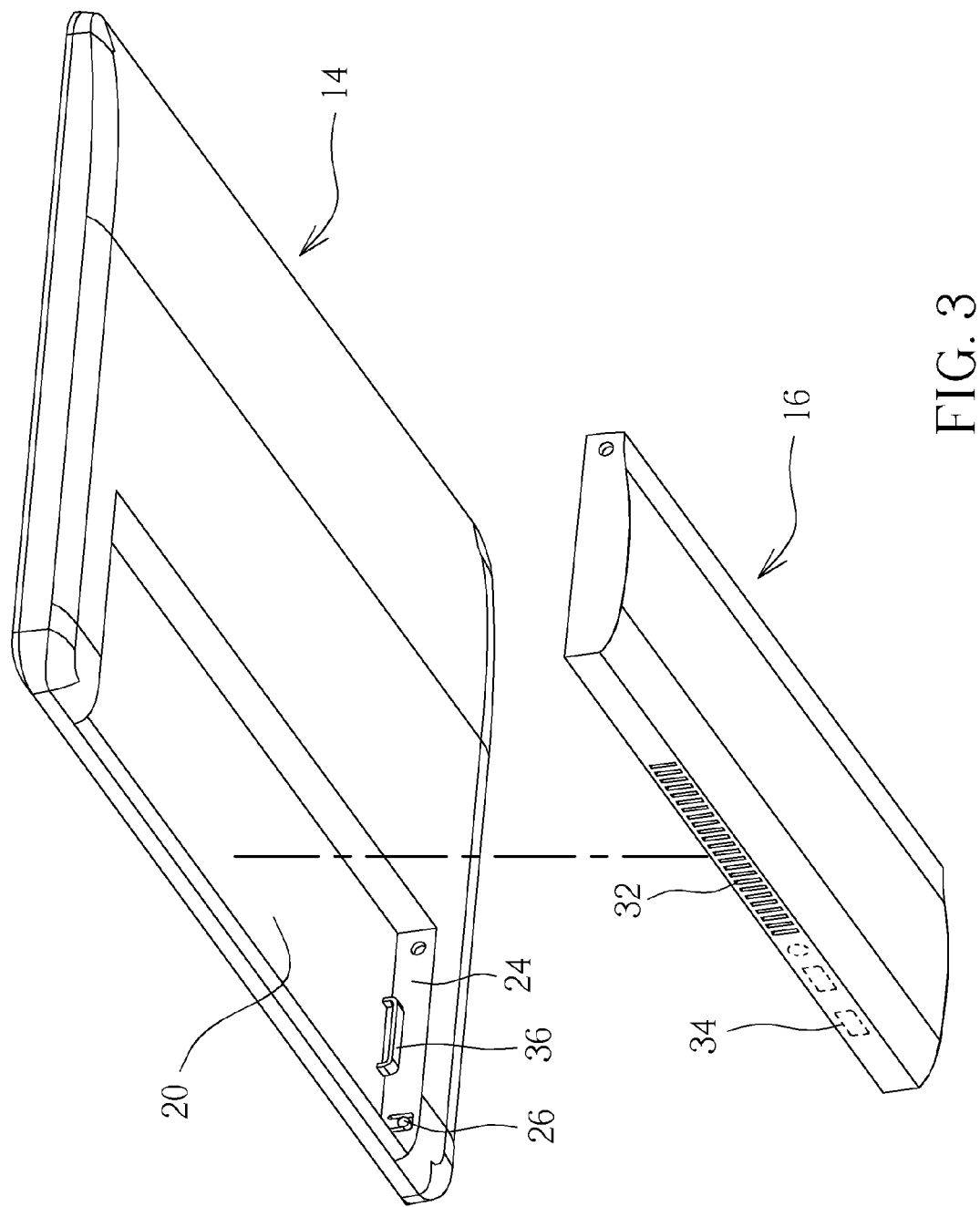
FIG. 3 is an exploded diagram of a main casing and a movable casing in FIG. 2.
Figure 4:
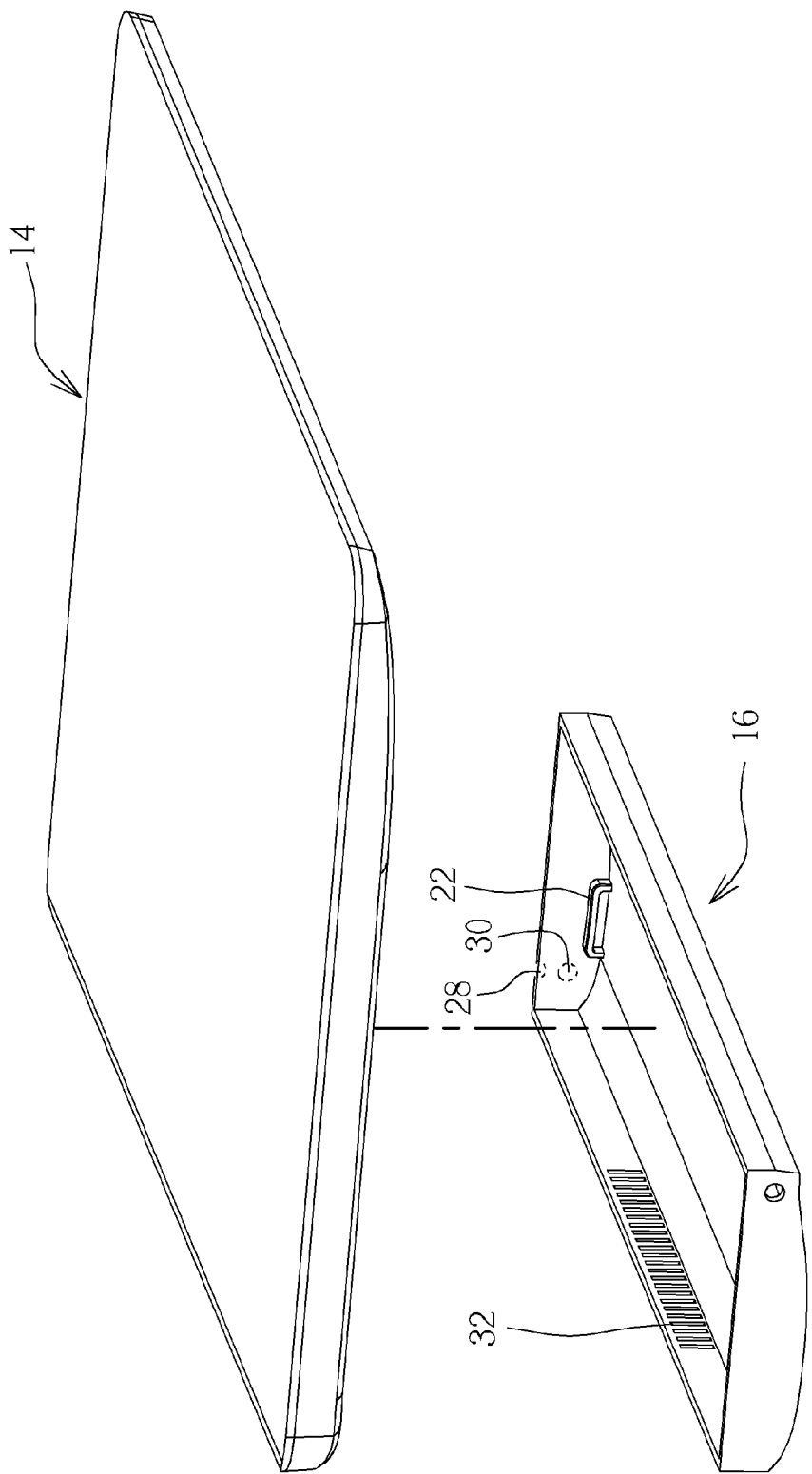
FIG. 4 is an exploded diagram of the main casing and the movable casing in FIG. 3 at another viewing angle.
Figure 5:
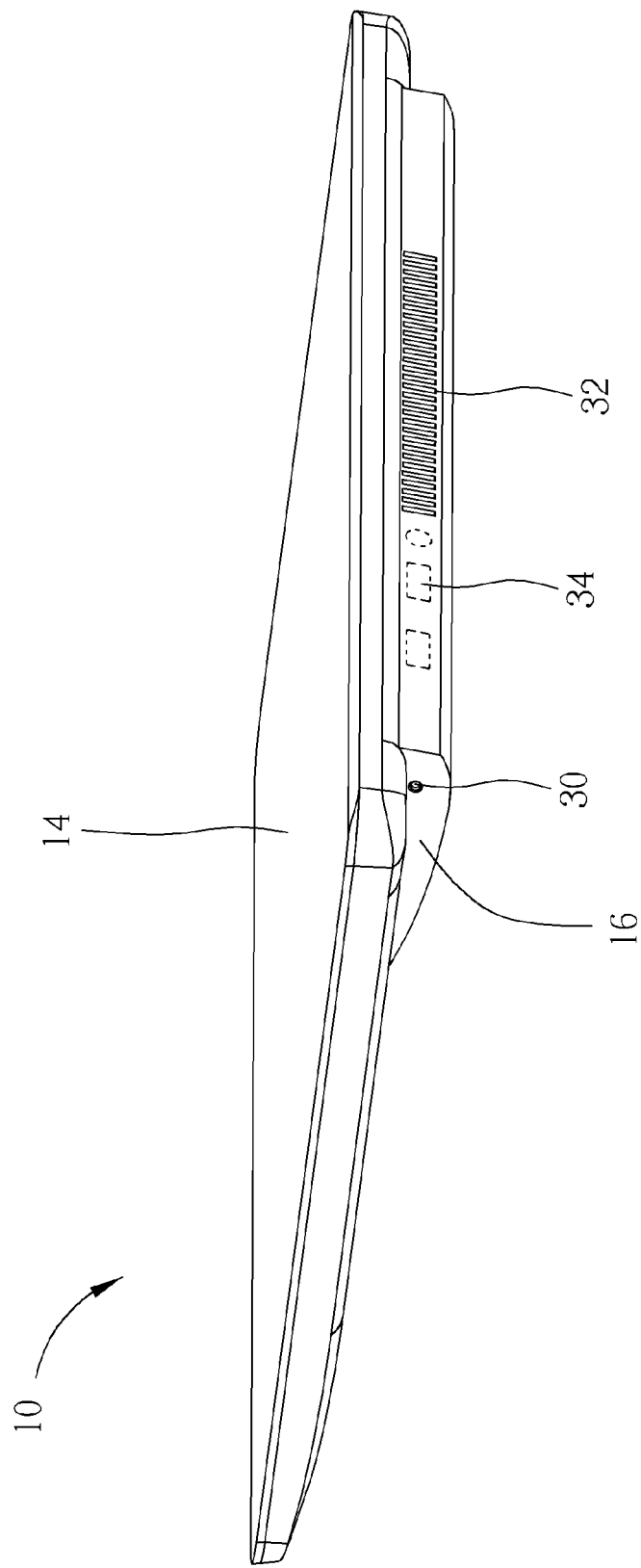
FIG. 5 is a diagram of the movable casing in FIG. 1 rotating to an open position relative to the main casing.

Please refer FIG. 3, FIG. 4, and FIG. 5. FIG. 3 is an exploded diagram of the main casing 14 and the movable casing 16 in FIG. 2. FIG. 4 is an exploded diagram of the main casing 14 and the movable casing 16 in FIG. 3 at another viewing angle. FIG. 5 is a diagram of the movable casing 16 in FIG. 1 rotating to an open position relative to the main casing 14. As shown in FIG. 3, FIG. 4, and FIG. 5, the main casing 14 has a recess structure 20, and the movable casing 16 is pivoted to the main casing 14 and has a first slot 22. Accordingly, the movable casing 16 could rotate to a closed position where the movable casing 16 is contained in the recess structure 20 relative to the main casing 14 (as shown in FIG. 1) or rotate to the open position where the movable casing 16 is exposed from the main casing 14 (as shown in FIG. 5). Furthermore, for positioning the movable casing 16, a positioning structure could be formed on the main casing 14 for engaging with a positioning structure formed on the movable casing 16. For example, in this embodiment, an elastic arm 26 could be formed on a side wall 24 of the recess structure 20, and a first positioning hole 28 and a second positioning hole 30 could be formed on the movable casing 16 corresponding to the elastic arm 26. Accordingly, the elastic arm 26 could be used for engaging with the first positioning hole 28 to position the movable casing 16 at the open position as shown in FIG. 5, and could be further used for engaging with the second positioning hole 30 to position the movable casing 16 at the closed position as shown in FIG. 1. To be noted, positioning between the movable casing 16 and the main casing 14 could be not limited to the positioning design mentioned in the aforesaid embodiment, meaning that the present invention could also adopt other conventional positioning design (e.g. a concave-convex matching design).

Furthermore, as shown in FIG. 5, in this embodiment, a heat dissipating hole 32 could be formed on a side of the movable casing 16 where the movable casing is exposed from the main casing 14 for heat dissipation of the computer device 10. The computer device 10 could further include at least one connecting port 34 (three shown in FIG. 5 and briefly depicted by dashed lines). The connecting port 34 could be a conventional input/output port device (e.g. a universal serial bus device) which is disposed at a rear side of a computer device, and could be disposed at the side of the movable casing 16 where the movable casing 16 is exposed from the main casing 14 for transmitting data between the computer device 10 and other peripheral device.

Figure 6:
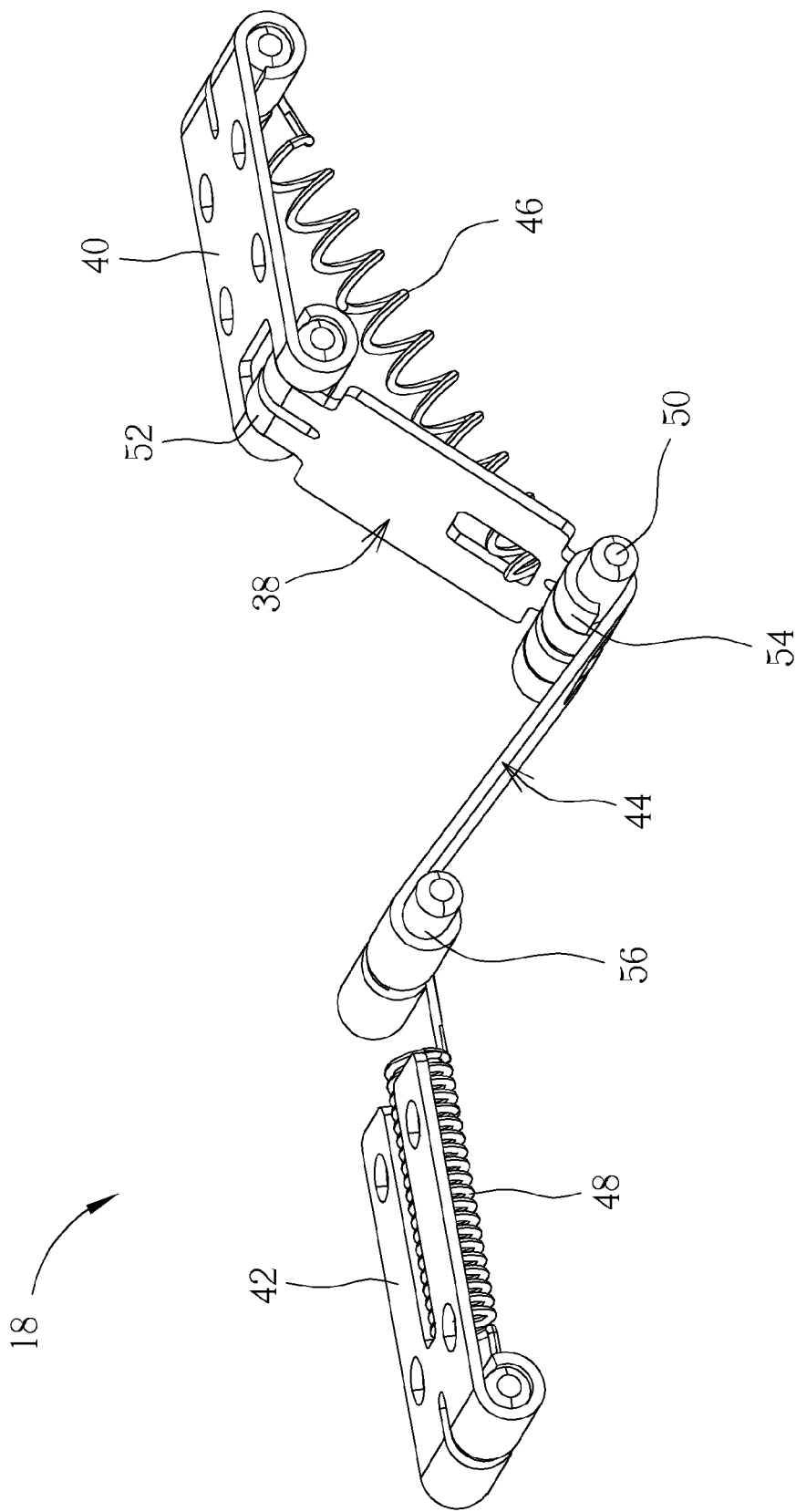
FIG. 6 is a diagram of a linkage mechanism in FIG. 2.
Figure 7:
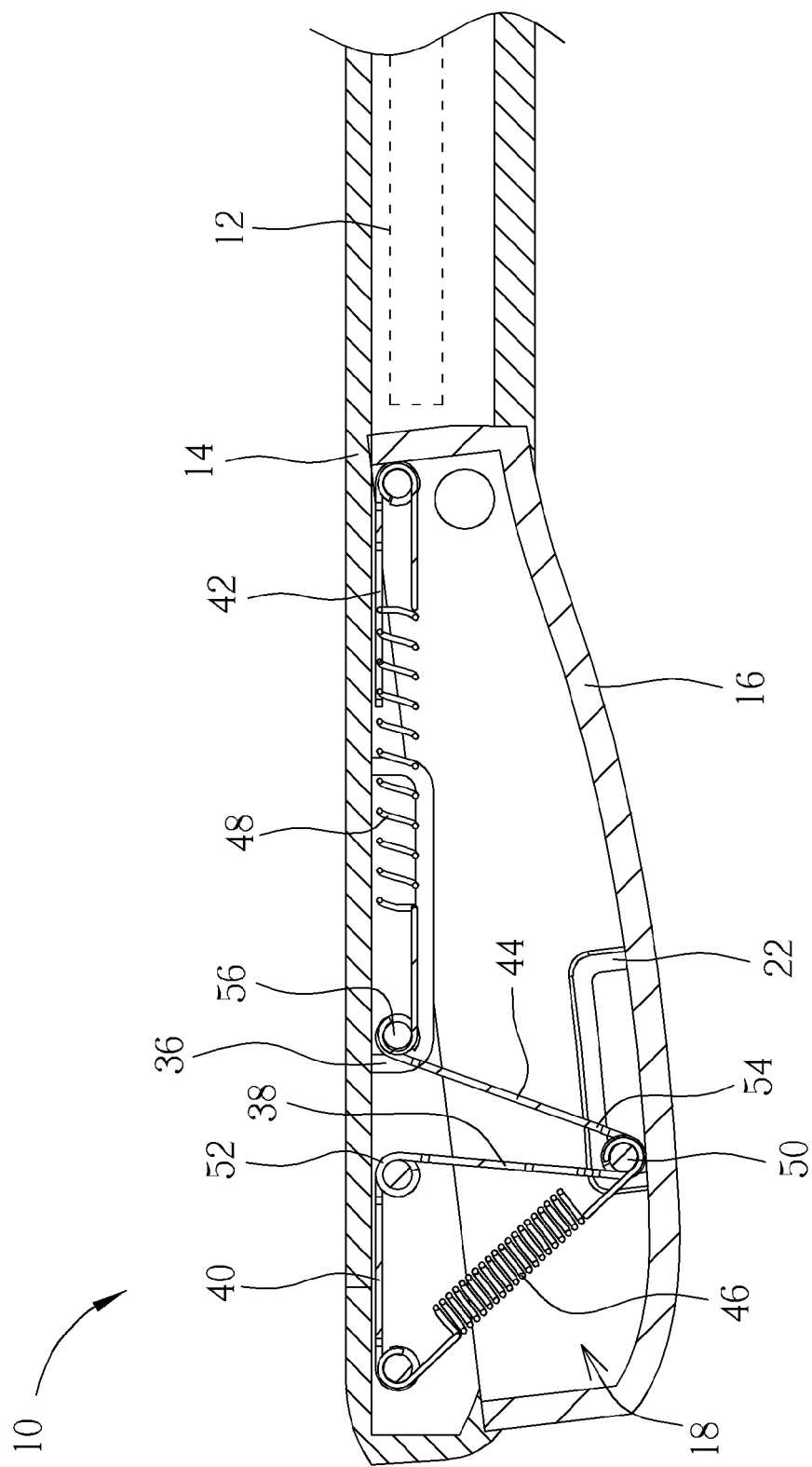
FIG. 7 is a partial sectional diagram of the movable casing in FIG. 2 rotating to the open position.

More detailed description for the linkage design of the linkage mechanism 18 is provided as follows. Please refer to FIG. 2, FIG. 6, and FIG. 7. FIG. 6 is a diagram of the linkage mechanism 18 in FIG. 2. FIG. 7 is a partial sectional diagram of the movable casing 16 in FIG. 2 rotating to the open position. As shown in FIG. 2, FIG. 6, and FIG. 7, a second slot 36 is formed on the side wall 24 of the recess structure 20, and the linkage mechanism 18 is disposed in the recess structure 20. The linkage mechanism 18 includes a first sheet 38, a second sheet 40, a third sheet 42, a fourth sheet 44, a first shape-memory alloy 46, and a second shape-memory alloy 48. The first sheet 38 has a first driving end 50 and a first connecting end 52. The first driving end 50 is movably inserted into the first slot 22. The second sheet 40 is disposed on the recess structure 20 and pivoted to the first connecting end 52. The third sheet 42 is disposed on the recess structure 20. The fourth sheet 44 has a second connecting end 54 and a second driving end 56. The second connecting end 54 is pivoted to the first driving end 50 of the first sheet 38. The second driving end 56 is movably inserted into the second slot 36. The first shape-memory alloy 46 is pivoted to the second sheet 40 and the first driving end 50 of the first sheet 38 for driving the first driving end 50 to move along the first slot 22 when being heated to shorten. The second shape-memory alloy 48 is pivoted to the third sheet 42 and the second driving end 56 of the fourth sheet 44 for driving the second driving end 56 of the fourth sheet 44 to move along the second slot 36 when being heated to shorten.

In this embodiment, the first shape-memory alloy 46 and the second shape-memory alloy 48 could be preferably a one-way shape-memory alloy and be a spiral spring shape, but not limited thereto, meaning that the first shape-memory alloy 46 and the second shape-memory alloy 48 could also adopt other telescopic structural design (e.g. an arch sheet structure or an S-shaped structure). The aforesaid one-way shape-memory alloy is an alloy which has a one-way shape memory function when being heated to the temperature greater than the austenitic finishing temperature (e.g. a Ni—Ti alloy), and the related description is omitted herein since it is commonly seen in the prior art. In brief, in this embodiment, the first shape-memory alloy 46 and the second shape-memory alloy 48 could be elongated at the temperature lower than the martensitic finishing temperature. In such a manner, when the first shape-memory alloy 46 and the second shape-memory alloy 48 are heated to the temperature greater than the austenitic finishing temperature, one-way shortening deformation of the first shape-memory alloy 46 and the second shape-memory alloy 48 occurs, meaning that the first shape-memory alloy 46 and the second shape-memory alloy 48 could shorten back to the compressed shape memorized at the high temperature (e.g. 400°-500°).

Via the aforesaid design, when a user wants to open the movable casing 16, the user could operate the computer device 10 to heat the first shape-memory alloy 46 to shorten from the length as shown in FIG. 2 to the length as shown in FIG. 7, so as to drive the first driving end 50 of the first sheet 38 to move along the first slot 22 from the position as shown in FIG. 2 to the position as shown in FIG. 7. During the aforesaid process, the first sheet 38 could rotate relative to the second sheet 40 with movement of the first driving end 50 along the first slot 22, so as to push the movable casing 16 to rotate relative to the main casing 14 from the closed position where the movable casing 16 is contained in the recess structure 20 as shown in FIG. 2 to the open position where the movable casing 16 is exposed from the main casing 14 as shown in FIG. 7. In such a manner, the heat dissipating hole 32 and the connecting port 34 could be exposed from the main casing 14 (as shown in FIG. 5) so that the user could utilize the connecting port 34 or perform the heat dissipating operation of the computer device 10 conveniently. Furthermore, via the linkage design in which the fourth sheet 44 is connected to the first driving end 50 of the first sheet 38 and the second shape-memory alloy 48, the second driving end 56 of the fourth sheet 44 could move to the position as shown in FIG. 7 with the aforesaid movement of the first driving end 50 along the first slot 22, so as to elongate the second shape-memory alloy 48 to the length as shown in FIG. 7.

On the other hand, when the user wants to close the movable casing 16, the user could operate the computer device 10 to heat the second shape-memory alloy 48 to shorten from the length as shown in FIG. 7 to the length as shown in FIG. 2, so as to drive the second driving end 56 of the fourth sheet 44 to move along the second slot 36 from the position as shown in FIG. 7 to the position as shown in FIG. 2. During the aforesaid process, the first driving end 50 of the first sheet 38 could move to the position as shown in FIG. 2 along the first slot 22 with movement of the second driving end 56 along the second slot 36, so as to pull the movable casing 16 to rotate relative to the main casing 14 to the open position as shown in FIG. 7 from the closed position as shown in FIG. 2. In such a manner, the movable casing 16 could be contained in the recess structure 20 (as shown in FIG. 1) to achieve the purpose that the heat dissipating hole 32 and the connecting port 34 could be hidden in the main casing 12. Furthermore, via the linkage design in which the first sheet 38 is connected to the second sheet 40 and the first shape-memory alloy 46, the first shape-memory alloy 46 could be elongated to the length as shown in FIG. 2 with the aforesaid movement of the first driving end 50 along the first slot 22, so that the computer device 10 could conveniently perform the next operation of opening the movable casing 16.

To be noted, the computer device 10 could adopt a shape-alloy heating design commonly seen in the prior art, such as the electrical heating method or transmitting heat energy generated by the computer device 10 to the first shape-memory alloy 46 and the second shape-memory alloy 48. For example, in this embodiment, the first shape-memory alloy 46 and the second shape-memory alloy 48 could be electrically connected to the computer body 12 to make the computer body 12 heat the first shape-memory alloy 46 and the second shape-memory alloy 48 respectively in an electrical heating manner.

Figure 8:
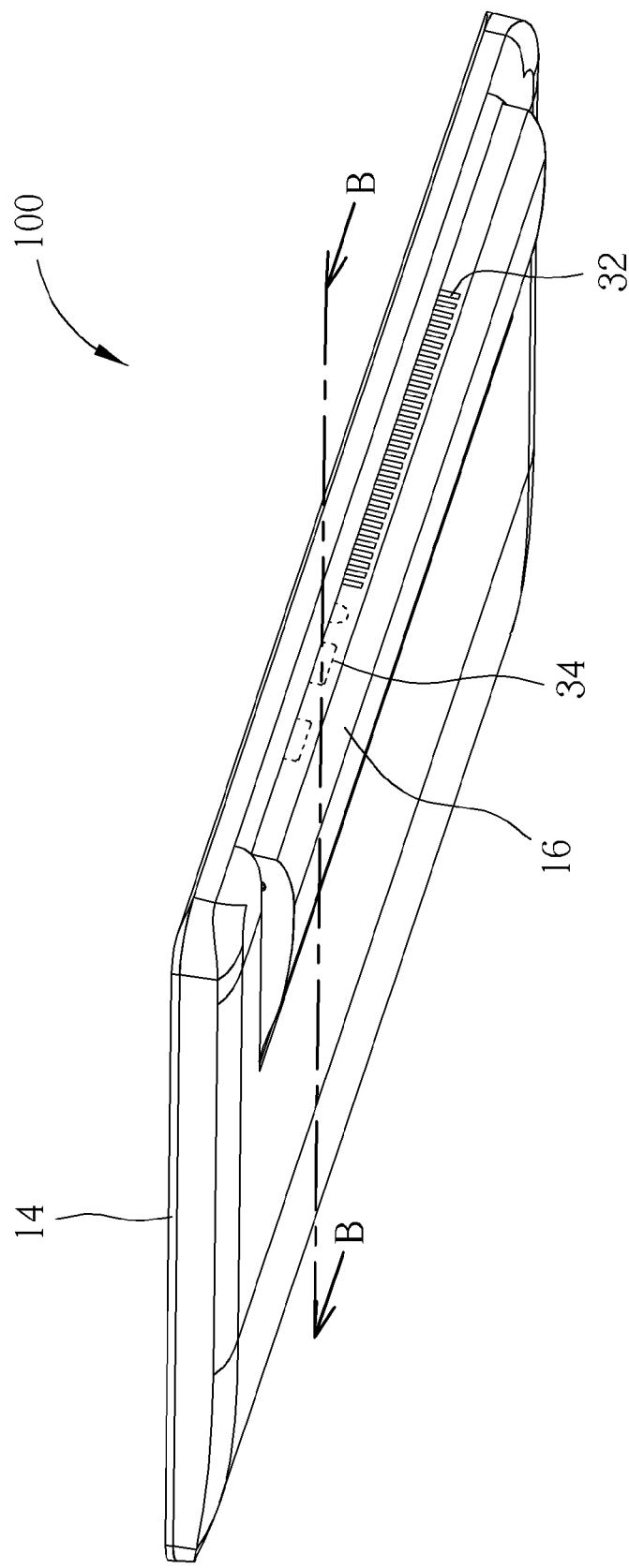
FIG. 8 is diagram of a computer device when the movable casing rotates to a half open position relative to the main casing according to a second embodiment of the present invention.
Figure 9:
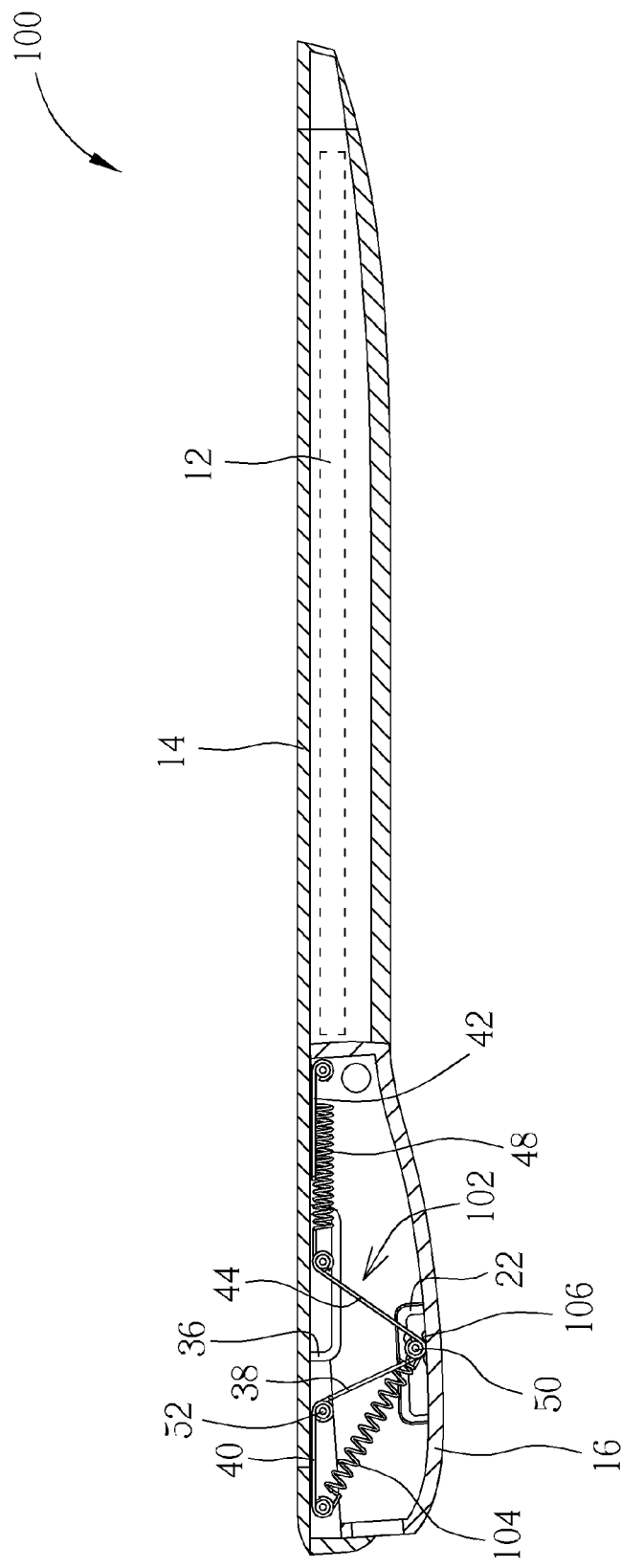
FIG. 9 is a sectional diagram of the computer device in FIG. 8 along a sectional line B-B.
Figure 10:
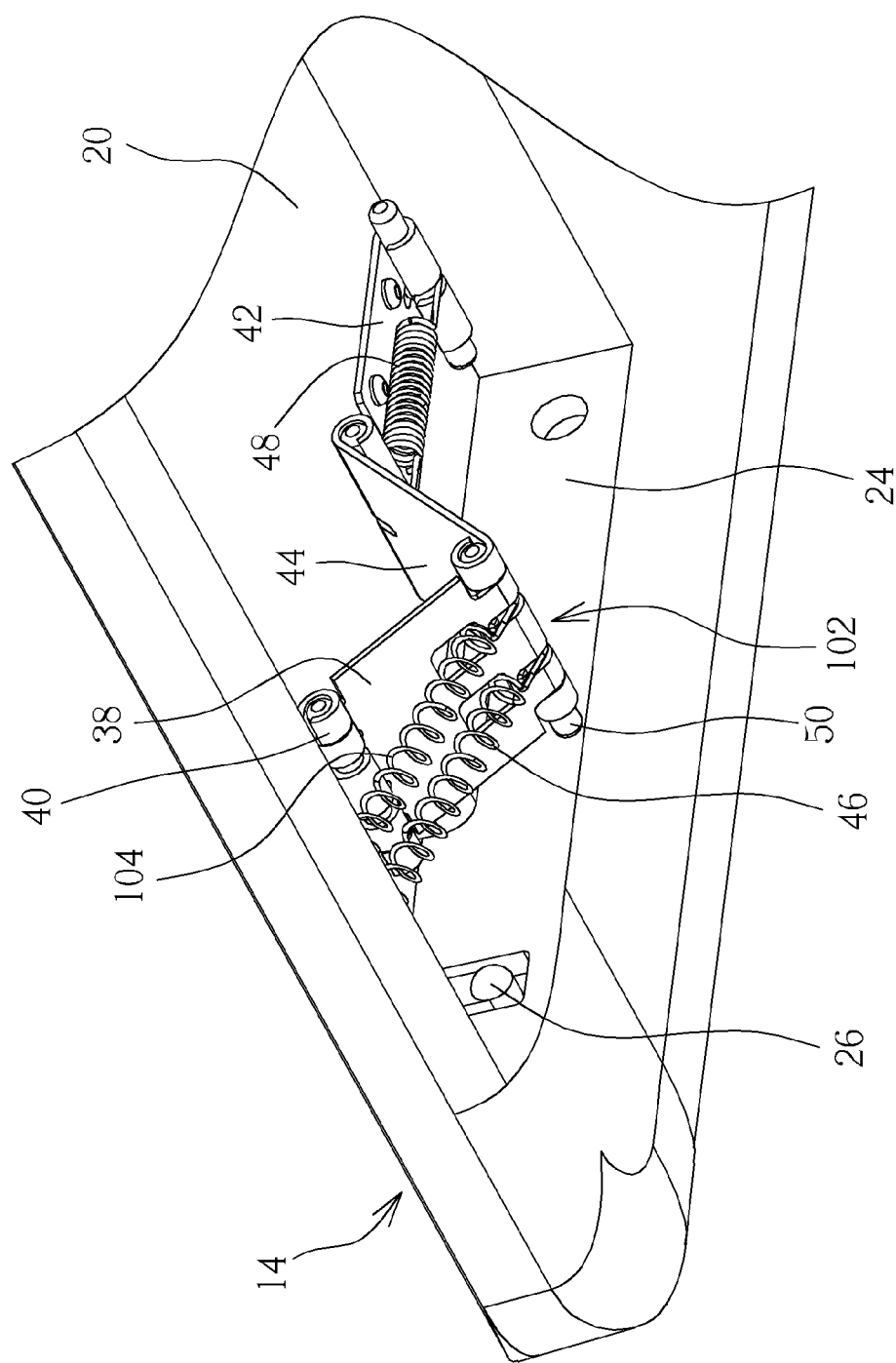
FIG. 10 is an assembly diagram of a linkage mechanism in FIG. 9 and the main casing.

It should be mentioned that the present invention could utilize more than two shape-memory alloys with different deformation lengths to make the movable casing 16 have a two-stage or multistage adjustment function. For example, please refer to FIG. 8, FIG. 9, and FIG. 10. FIG. 8 is diagram of a computer device 100 when the movable casing 16 rotates to a half open position relative to the main casing 14 according to a second embodiment of the present invention. FIG. 9 is a sectional diagram of the computer device 100 in FIG. 8 along a sectional line B-B. FIG. 10 is an assembly diagram of a linkage mechanism 102 in FIG. 9 and the main casing 14. The main casing 14 is partially depicted in FIG. 10. Components both mentioned in the first embodiment and the second embodiment represent components with similar functions or structures, and the related description is omitted herein. As shown in FIG. 8, FIG. 9, and FIG. 10, the computer device 100 includes the computer body 12, the main casing 14, the movable casing 16, and a linkage mechanism 102. The linkage mechanism 102 includes the first sheet 38, the second sheet 40, the third sheet 42, the fourth sheet 44, the first shape-memory alloy 46, the second shape-memory alloy 48, and a third shape-memory alloy 104. The third shape-memory alloy 104 is pivoted to the second sheet 40 and the first driving end 50 of the first sheet 38. The third shape-memory alloy 104 could preferably be a one-way shape-memory alloy and could be a spiral spring shape, but not limited thereto, meaning that the third shape-memory alloy 104 could also adopt other telescopic structural design (e.g. an arch sheet structure or an S-shaped structure). In this embodiment, the shortening deformation length of the third shape-memory alloy 104 is preferably less than the shortening deformation length of the first shape-memory alloy 46.

Via the aforesaid design, when the user wants to half open the movable casing 16 (e.g. for making the main casing 14 partially cover the heat dissipating hole 32 to generate the low heat dissipating effect), the user could operate the computer device 100 to heat the third shape-memory alloy 104 to shorten to the length as shown in FIG. 9, so as to drive the first driving end 50 of the first sheet 38 to move along the first slot 22 to the position as shown in FIG. 9. During the aforesaid process, the first sheet 38 could push the movable casing 16 with movement of the first driving end 50 along the first slot 22, so as to make the movable casing 16 rotate relative to the main casing 14 to the half open position where the movable casing 16 is partially exposed from the main casing 14 as shown in FIG. 8. In such a manner, the heat dissipating hole 32 could be partially covered by the main casing 14. Furthermore, as shown in FIG. 9, in this embodiment, a concave portion 106 could be formed in the first slot 22. Accordingly, the concave portion 106 could be engaged with the first driving end 50 of the first sheet 38 when the movable casing 14 rotates to the half open position as shown in FIG. 9, so as to position the movable casing 14 more steadily. As for the related description for the computer device 100 driving the movable casing 16 to the open position or the closed position, it could be reasoned by analogy according to the aforesaid embodiment and therefore omitted herein.

Figure 11:
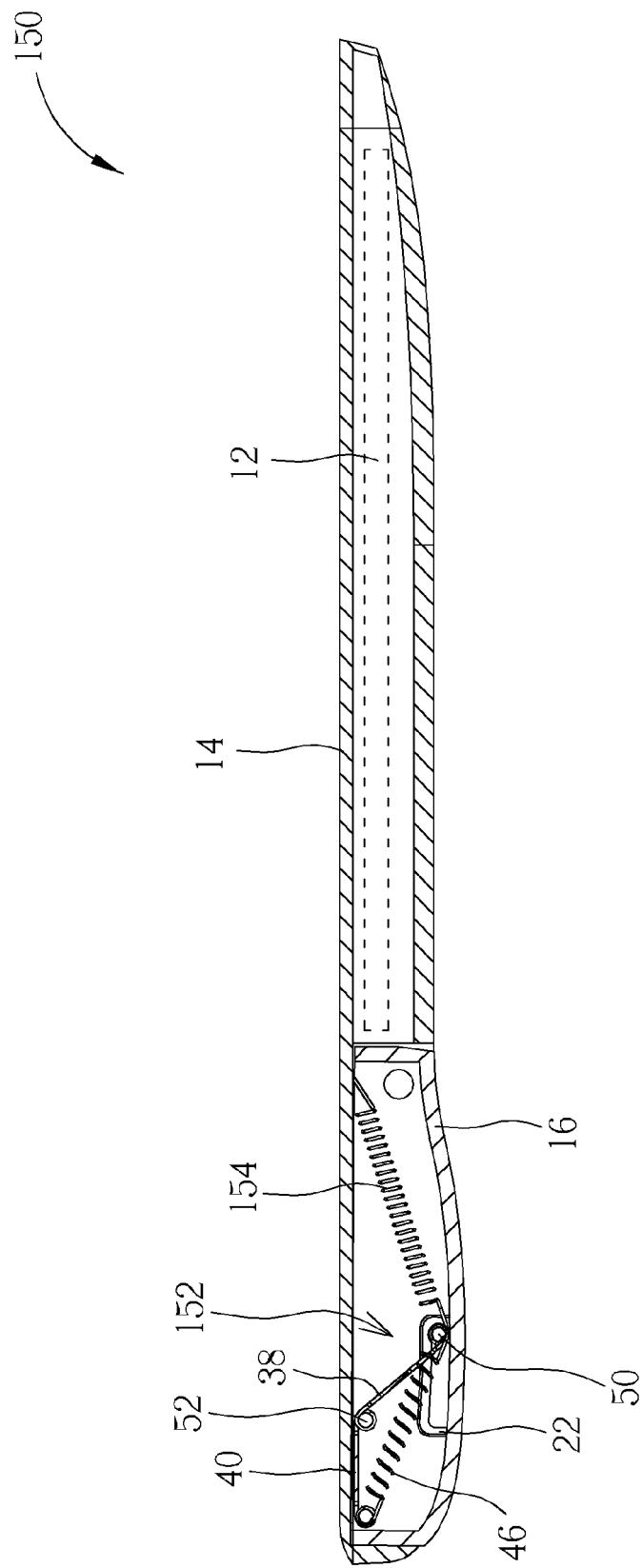
FIG. 11 is a sectional diagram of a computer device according to a third embodiment of the present invention.
Figure 12:
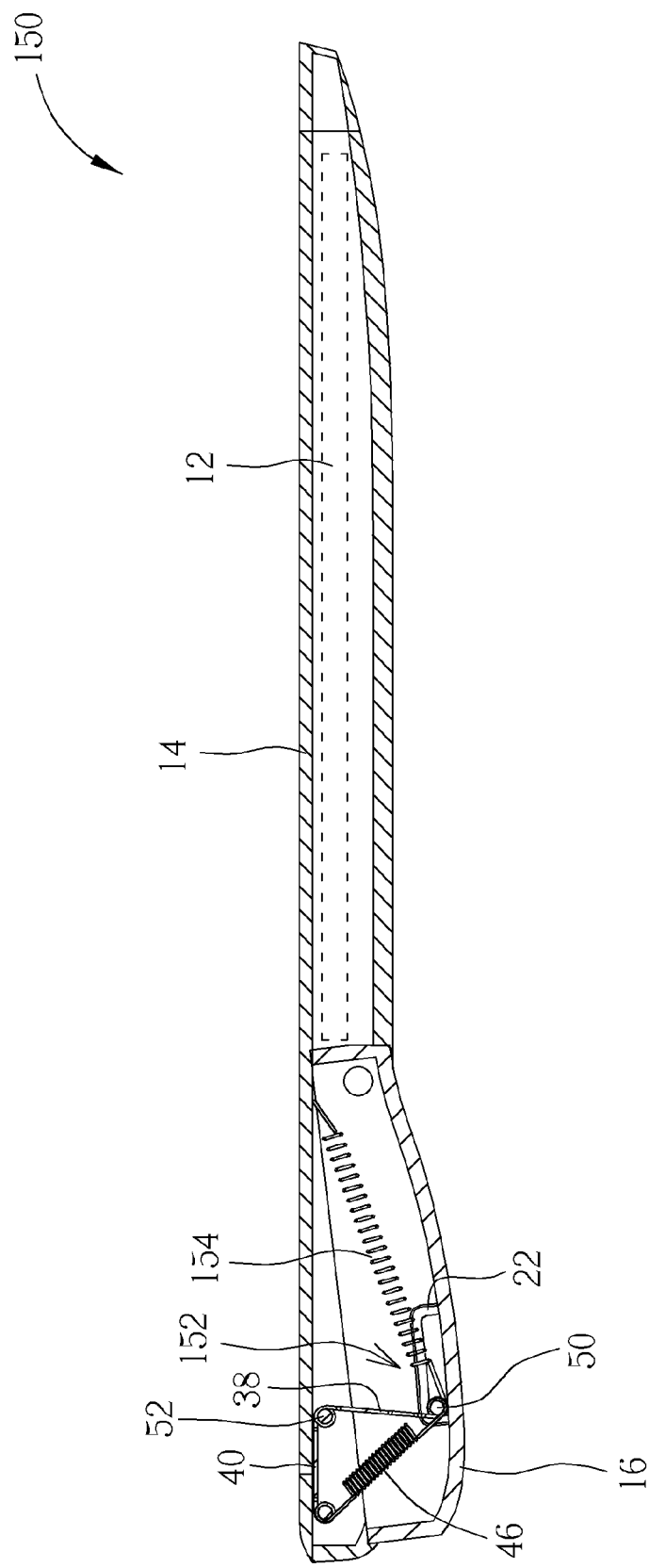
FIG. 12 is a sectional diagram of the movable casing in FIG. 11 rotating to the open position relative to the main casing.

The third sheet, the fourth sheet, and the second shape-memory alloy mentioned in the aforesaid embodiments could be omitted so as to simplify the mechanical design of the linkage mechanism of the present invention. For example, please refer to FIG. 11 and FIG. 12. FIG. 11 is a sectional diagram of a computer device 150 according to a third embodiment of the present invention. FIG. 12 is a sectional diagram of the movable casing 16 in FIG. 11 rotating to the open position relative to the main casing 14. Components both mentioned in the third embodiment and the aforesaid embodiments represent components with similar functions or structures, and the related description is omitted herein. As shown in FIG. 11 and FIG. 12, the computer device 150 includes the computer body 12, the main casing 14, the movable casing 16, and a linkage mechanism 152. The linkage mechanism 152 includes the first sheet 38, the second sheet 40, the first shape-memory alloy 46, and a second shape-memory alloy 154. The second shape-memory alloy 154 is pivoted to the recess structure 20 and the first driving end 50 of the first sheet 38. The second shape-memory alloy 154 could preferably be a one-way shape-memory alloy and could be a spiral spring shape, but not limited thereto, meaning that the second shape-memory alloy 154 could also adopt other telescopic structural design (e.g. an arch sheet structure or an S-shaped structure). The second shape-memory alloy 154 could adopt the aforesaid design in which the shape-memory alloy could be heated to shorten to the desired length.

Via the aforesaid design, when the user wants to close the movable casing 16, the user could operate the computer device 150 to heat the second shape-memory alloy 154 to shorten from the length as shown in FIG. 11 to the length as shown in FIG. 12, so as to directly drive the first driving end 50 of the first sheet 38 to move along the first slot 22 to the position as shown in FIG. 12. During the aforesaid process, the first sheet 38 could pull the movable casing 16 with movement of the first driving end 50 along the first slot 22, so as to make the movable casing 16 rotate relative to the main casing 14 to the closed position as shown in FIG. 12. In such a manner, the movable casing 16 could be closed. As for the related description for the computer device 150 driving the movable casing 16 to the open position or the closed position, it could be reasoned by analogy according to the aforesaid embodiments and therefore omitted herein.

Figure 13:
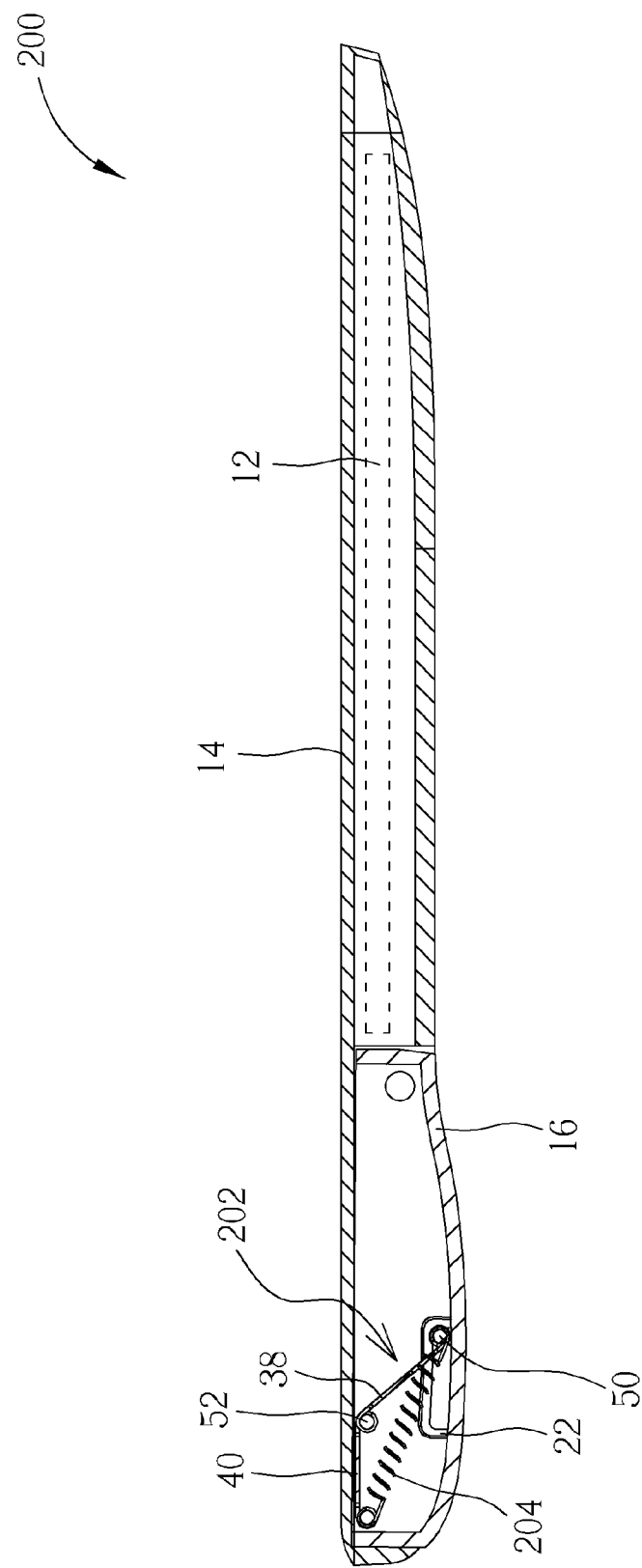
FIG. 13 is a sectional diagram of a computer device according to a fourth embodiment of the present invention.
Figure 14:
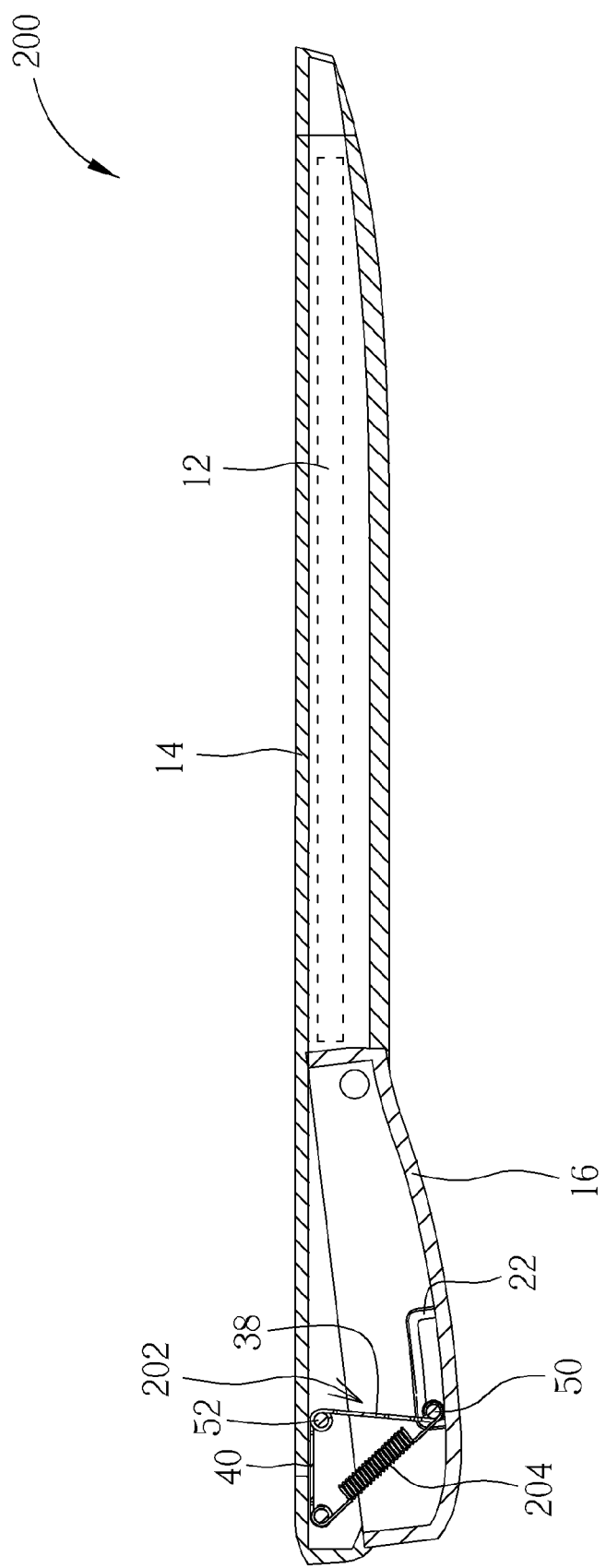
FIG. 14 is a sectional diagram of the movable casing in FIG. 13 rotating to the open position relative to the main casing.

Furthermore, please refer to FIG. 13 and FIG. 14. FIG. 13 is a sectional diagram of a computer device 200 according to a fourth embodiment of the present invention. FIG. 14 is a sectional diagram of the movable casing 16 in FIG. 13 rotating to the open position relative to the main casing 14. Components both mentioned in the fourth embodiment and the aforesaid embodiments represent components with similar functions or structures, and the related description is omitted herein. As shown in FIG. 13 and FIG. 14, the computer device 200 includes the computer body 12, the main casing 14, the movable casing 16, and a linkage mechanism 202. The linkage mechanism 202 includes the first sheet 38, the second sheet 40, and a first shape-memory alloy 204. The first shape-memory alloy 204 is pivoted to the second sheet 40 and the first driving end 50 of the first sheet 38. The first shape-memory alloy 204 could preferably be a two-way shape-memory alloy and could be a spiral spring shape, but not limited thereto, meaning that the first shape-memory alloy 204 could also adopt other telescopic structural design (e.g. an arch sheet structure or an S-shaped structure). The aforesaid two-way shape-memory alloy is an alloy which has a two-way shape memory function when being heated to different temperatures (e.g. a Ni—Ti alloy), and the related description is omitted herein since it is commonly seen in the prior art.

In brief, in this embodiment, the first shape-memory alloy 204 could be elongated at the temperature lower than the austenitic finishing temperature. In such a manner, when the first shape-memory alloy 204 is at the temperature greater than the austenitic finishing temperature, the first shape-memory alloy 204 could shorten back to the compressed shape memorized at the high temperature (e.g. 400°-500°). On the other hand, when the first shape-memory alloy 204 is at the temperature lower than the martensitic finishing temperature, the first shape-memory alloy 204 could elongate accordingly. That is, the first shape-memory alloy 204 could correspondingly shorten or elongate when being heated to different temperatures.

Via the aforesaid design, when the user wants to open the movable casing 16, the user could operate the computer device 200 to heat the first shape-memory alloy 204 to shorten from the length as shown in FIG. 13 to the length as shown in FIG. 14 for driving the first driving end 50 of the first sheet 38 to move along the first slot 22 from the position as shown in FIG. 13 to the position as shown in FIG. 14, so as to push the movable casing 16 to rotate relative to the main casing 14 from the closed position as shown in FIG. 13 to the open position as shown in FIG. 14 for opening the movable casing 16. On the other hand, when the user wants to close the movable casing 16, the user could operate the computer device 200 to heat the first shape-memory alloy 204 to elongate from the length as shown in FIG. 14 to the length as shown in FIG. 13, so as to drive the first driving end 50 of the first sheet 38 to move along the first slot 22 from the position as shown in FIG. 14 to the position as shown in FIG. 13. Accordingly, the movable casing 16 could rotate relative to the main casing 14 from the open position as shown in FIG. 14 to the closed position as shown in FIG. 13.

To be noted, the first shape-memory alloy 204 could also be a one-way shape-memory alloy, meaning that the computer device 200 could only have the function of automatically opening the movable casing 16 and the user needs to close the movable casing 16 manually, or the computer device 200 could only have the function of automatically closing the movable casing 16 and the user needs to open the movable casing 16 manually. As for which design is utilized, it depends on the practical application of the computer device 200.

Figure 15:
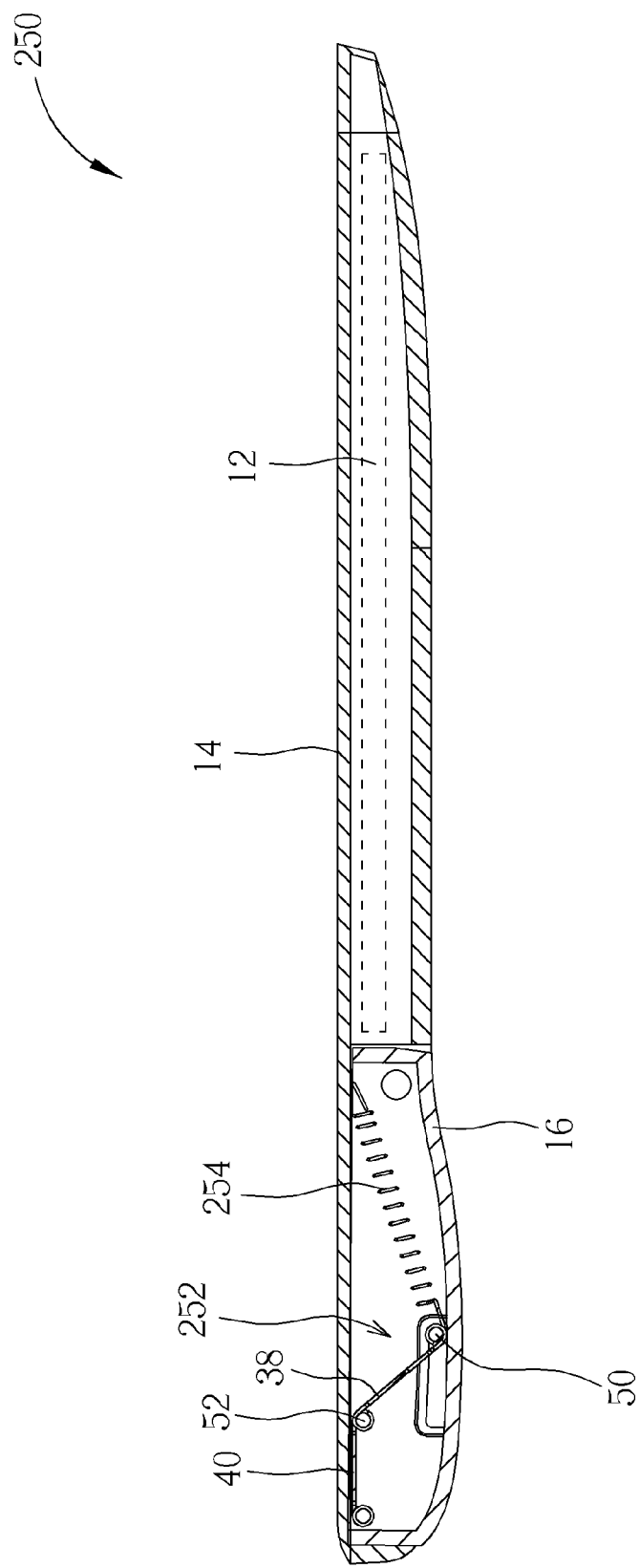
FIG. 15 is a sectional diagram of a computer device according to a fifth embodiment of the present invention.
Figure 16:
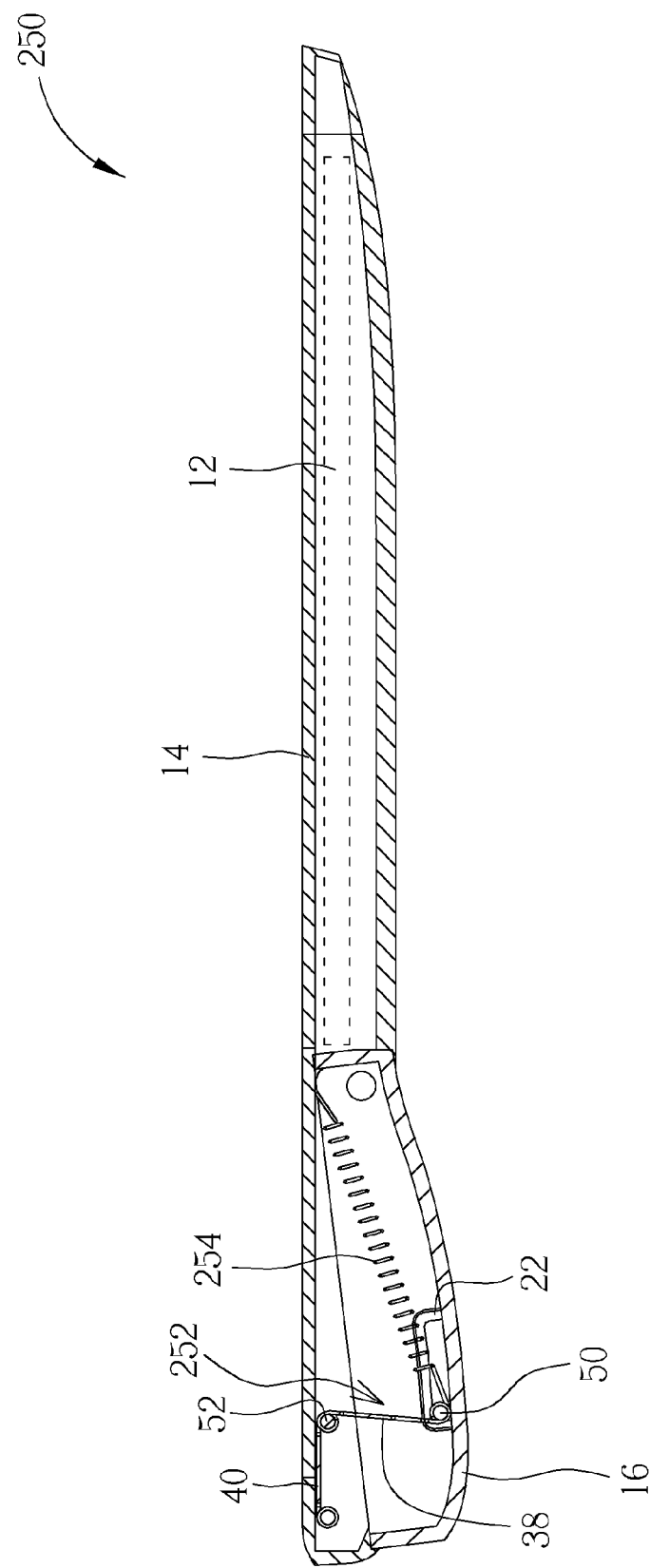
FIG. 16 is a sectional diagram of the movable casing in FIG. 15 rotating to the open position relative to the main casing.

Furthermore, please refer to FIG. 15 and FIG. 16. FIG. 15 is a sectional diagram of a computer device 250 according to a fifth embodiment of the present invention. FIG. 16 is a sectional diagram of the movable casing 16 in FIG. 15 rotating to the open position relative to the main casing 14. Components both mentioned in the fifth embodiment and the aforesaid embodiments represent components with similar functions or structures, and the related description is omitted herein. As shown in FIG. 15 and FIG. 16, the computer device 250 includes the computer body 12, the main casing 14, the movable casing 16, and a linkage mechanism 252. The linkage mechanism 252 includes the first sheet 38, the second sheet 40, and the first shape-memory alloy 254. The first shape-memory alloy 254 is pivoted to the recess structure 20 and the first driving end 50 of the first sheet 38. The first shape-memory alloy 204 could preferably be a two-way shape-memory alloy and could be a spiral spring shape, but not limited thereto, meaning that the first shape-memory alloy 254 could also adopt other telescopic structural design (e.g. an arch sheet structure or an S-shaped structure). In this embodiment, the first shape-memory alloy 254 could be compressed at the temperature lower than the martensitic finishing temperature. In such a manner, when the first shape-memory alloy 254 is at the temperature greater than the austenitic finishing temperature, the first shape-memory alloy 254 could elongate back to the elongated shape memorized at the high temperature (e.g. 400°-500°). On the other hand, when the first shape-memory alloy 254 is at the temperature lower than the martensitic finishing temperature, the first shape-memory alloy 254 could shorten accordingly.

Via the aforesaid design, when the user wants to open the movable casing 16, the user could operate the computer device 250 to heat the first shape-memory alloy 254 to elongate from the length as shown in FIG. 15 to the length as shown in FIG. 16, so as to drive the first driving end 50 of the first sheet 38 along the first slot 22 from the position as shown in FIG. 15 to the position as shown in FIG. 16. In such a manner, the movable casing 16 could be pushed to rotate relative to the main casing 14 from the closed position as shown in FIG. 15 to the open position as shown in FIG. 16. On the other hand, when the user wants to close the movable casing 16, the user could operate the computer device 250 to heat the first shape-memory alloy 254 to shorten from the length as shown in FIG. 16 to the length as shown in FIG. 15, so as to drive the first driving end 50 of the first sheet 38 to move from the position as shown in FIG. 16 to the position as shown in FIG. 15. Accordingly, the movable casing 16 could be pulled to rotate relative to the main casing 14 from the open position as shown in FIG. 16 to the closed position as shown in FIG. 15.

Similarly, the first shape-memory alloy 254 could also be a one-way shape-memory alloy, meaning that the computer device 250 could only have the function of automatically opening the movable casing 16 and the user needs to close the movable casing 16 manually, or the computer device 250 could only have the function of automatically closing the movable casing 16 and the user needs to open the movable casing 16 manually. As for which design is utilized, it depends on the practical application of the computer device 250. Moreover, the design of utilizing more than two shape-memory alloys with different deformation lengths to make the movable casing 16 have a two-stage or multistage adjustment function mentioned in the second embodiment could also be applied to the third, fourth, fifth embodiments, and the related description could be reasoned by analogy according to the second embodiment and therefore omitted herein.

Compared with the prior art utilizing the step motor to drive the movable casing, the present invention adopts the design in which the shape-memory alloy is heated to shorten or elongate for driving the movable casing to be contained in or exposed from the main casing, so as to achieve the purpose that the computer device could provide the function of hiding the movable casing. In such a manner, since there is no need to dispose the step motor in the computer device, the present invention could further reduce the inner space of the computer device needed for opening or closing the movable casing, so as to be advantage to the thinning design of the computer device and effectively reduce the overall manufacturing cost of the computer device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computer device comprising:
   a main casing having a recess structure, a first positioning structure being formed on a side wall of the recess structure;
   a computer body disposed in the main casing;
   a movable casing having a first slot, the movable casing being pivoted to the main casing for rotating to a closed position where the movable casing is contained in the recess structure or an open position where the movable casing is exposed from the main casing relative to the main casing, a second positioning structure being formed on the movable casing corresponding to the first positioning structure, the first positioning structure being for engaging with the second positioning structure to position the movable casing at the open position; and a linkage mechanism disposed in the recess structure, the linkage mechanism comprising:
- a first sheet having a first driving end and a first connecting end, the first driving end being movably inserted into the first slot;
- a second sheet disposed on the recess structure and pivoted to the first connecting end; and
- a first shape-memory alloy pivoted to one of the second sheet and the recess structure and the driving end of the first sheet, for driving the first driving end to move along the first slot when being heated to shorten or elongate to make the first sheet rotate relative to the second sheet, so as to push the movable casing to rotate from the closed position to the open position relative to the main casing.

2. The computer device of claim 1, wherein the first shape-memory alloy is pivoted to the second sheet and the first driving end for pulling the first driving end to move along the first slot when being heated to shorten, so as to push the movable casing to rotate from the closed position to the open position.

3. The computer device of claim 2, wherein the first shape-memory alloy is a one-way shape-memory alloy.

4. The computer device of claim 2, wherein the first shape-memory alloy is a two-way shape-memory alloy, and the first shape-memory alloy is further for pushing the first driving end to move along the first slot when being heated to elongate, so as to pull the movable casing to rotate from the open position to the closed position.

5. The computer device of claim 2, wherein a second slot is further formed on the side wall of the recess structure, and the linkage mechanism further comprises:
- a third sheet disposed on the recess structure;
- a fourth sheet having a second connecting end and a second driving end, the second connecting end being pivoted to the first driving end, the second driving end being movably inserted into the second slot; and
- a second shape-memory alloy pivoted to the third sheet and the second driving end of the fourth sheet, for driving the second driving end of the fourth sheet to move along the second slot when being heated to shorten to make the first driving end of the first sheet move along the first slot, so as to pull the movable casing to rotate from the open position to the closed position.

6. The computer device of claim 5, wherein the second shape-memory alloy is a one-way shape-memory alloy.

7. The computer device of claim 5, wherein the linkage mechanism further comprises:
- a third shape-memory alloy pivoted to the second sheet and the first driving end of the first sheet, for driving the first driving end to move along the first slot when being heated to shorten, so as to push the movable casing from the closed position to a half open position where the movable casing is partially exposed from the recess structure relative to the main casing, a shortening deformation length of the third shape-memory alloy being less than a shortening deformation length of the first shape-memory alloy.

8. The computer device of claim 7, wherein the third shape-memory alloy is a one-way shape-memory alloy.

9. The computer device of claim 7, wherein a heat dissipating hole is formed on a side of the movable casing exposed from the main casing, and the main casing partially covers the heat dissipating hole when the movable casing rotates from the closed position to the half open position.

10. The computer device of claim 7, wherein a concave portion is formed in the first slot, and the concave portion is engaged with the first driving end when the movable casing rotates to the half open position.

11. The computer device of claim 2, wherein the linkage mechanism further comprises:
- a second shape-memory alloy pivoted to the first driving end of the first sheet and the recess structure, for driving the first driving end of the first sheet to move along the first slot when being heated to shorten, so as to pull the movable casing to rotate from the open position to the closed position.

12. The computer device of claim 11, wherein the second shape-memory alloy is one-way shape-memory alloy.

13. The computer device of claim 1, wherein the first shape-memory alloy is pivoted to the first driving end of the first sheet and the recess structure, and the first shape-memory alloy is for pushing the first driving end to move along the first slot when being heated to elongate, so as to push the movable casing to rotate from closed position to the open position.

14. The computer device of claim 13, wherein the first shape-memory alloy is a one-way shape-memory alloy.

15. The computer device of claim 13, wherein the first shape-memory alloy is a two-way shape-memory alloy, and the first shape-memory alloy is further for pulling the first driving end to move along the first slot when being heated to shorten, so as to pull the movable casing to rotate from the open position to the closed position.

16. The computer device of claim 1, wherein the first shape-memory alloy is electrically connected to the computer body, and the computer body is for heating the first shape-memory alloy in an electric heating manner.

17. The computer device of claim 1, wherein the first shape-memory alloy is a spiral-spring shape.

18. The computer device of claim 1, wherein a heat dissipating hole is formed on a side of the movable casing exposed from the main casing.

19. The computer device of claim 1 further comprising:
- at least one connecting port disposed on a side of the movable casing exposed from the main casing.

20. The computer device of claim 1, wherein a third positioning structure is formed on the movable casing corresponding to the first positioning structure, and the first positioning structure is further for engaging with the third positioning structure to position the movable casing at the closed position.

21. The computer device of claim 20, wherein the first positioning structure is an elastic arm located on the recess structure, and the second positioning structure and the third positioning structure are respectively a positioning hole located on the movable casing.

* * * * *